(12) United States Patent
Minagata

(10) Patent No.: US 10,490,795 B2
(45) Date of Patent: Nov. 26, 2019

(54) ELECTRICITY STORAGE DEVICE

(71) Applicant: KABUSHIKI KAISHA TOYOTA JIDOSHOKKI, Kariya-shi, Aichi-ken (JP)

(72) Inventor: Atsushi Minagata, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 205 days.

(21) Appl. No.: 14/400,709

(22) PCT Filed: May 30, 2013

(86) PCT No.: PCT/JP2013/064972
§ 371 (c)(1),
(2) Date: Nov. 12, 2014

(87) PCT Pub. No.: WO2013/180198
PCT Pub. Date: Dec. 5, 2013

(65) Prior Publication Data
US 2015/0140401 A1 May 21, 2015

(30) Foreign Application Priority Data
Jun. 1, 2012 (JP) ................................. 2012-126458

(51) Int. Cl.
*H01M 2/16* (2006.01)
*H01M 10/04* (2006.01)
(Continued)

(52) U.S. Cl.
CPC .......... *H01M 2/1673* (2013.01); *H01G 11/12* (2013.01); *H01G 11/52* (2013.01);
(Continued)

(58) Field of Classification Search
CPC ........ H01G 11/12; H01G 11/52; H01G 11/72; H01G 11/76; H01M 10/0413;
(Continued)

(56) References Cited

U.S. PATENT DOCUMENTS

2002/0119367 A1 8/2002 Watanabe et al.
2012/0028100 A1* 2/2012 Maeda .................... H01M 2/16
429/139

(Continued)

FOREIGN PATENT DOCUMENTS

CN 1372345 A 10/2002
CN 102623740 A 8/2012
(Continued)

OTHER PUBLICATIONS

Translation of JP 2009-123582A.*
(Continued)

*Primary Examiner* — Lingwen R Zeng
(74) *Attorney, Agent, or Firm* — Sughrue Mion, PLLC

(57) ABSTRACT

A rechargeable battery includes positive and negative electrodes and first and second separator portions. The positive electrode includes a positive metal foil and a positive active material layer. A positive active material-free portion is formed on a first end of the positive electrode. The positive active material layer extends to a second end. The negative electrode includes a negative metal foil and a negative active material layer. A negative active material-free portion is formed on a third end of the negative electrode. The negative active material layer extends to a fourth end. Each of the first and second separator portions includes a strong bonding portion and a weak bonding portion. The strong bonding portion is located proximate to the first end and extends
(Continued)

along the first end. The weak bonding portion is located proximate to the second end and extends along the second end.

14 Claims, 6 Drawing Sheets

(51) Int. Cl.
    *H01G 11/52*     (2013.01)
    *H01M 2/18*     (2006.01)
    *H01G 11/12*     (2013.01)
    *H01G 11/72*     (2013.01)
    *H01G 11/76*     (2013.01)
    *H01M 2/26*     (2006.01)
    *H01M 10/058*     (2010.01)
    *H01M 10/0585*     (2010.01)

(52) U.S. Cl.
CPC ............ *H01G 11/72* (2013.01); *H01G 11/76* (2013.01); *H01M 2/1653* (2013.01); *H01M 2/18* (2013.01); *H01M 10/0413* (2013.01); *H01M 10/0463* (2013.01); *H01M 2/266* (2013.01); *H01M 10/058* (2013.01); *H01M 10/0585* (2013.01); *H01M 2220/20* (2013.01); *Y02E 60/13* (2013.01); *Y02T 10/7022* (2013.01)

(58) Field of Classification Search
CPC ........... H01M 10/0463; H01M 10/058; H01M 10/0585; H01M 2220/20; H01M 2/1653; H01M 2/1673; H01M 2/18; H01M 2/266; Y02E 60/13; Y02T 10/07; Y02T 10/7022
See application file for complete search history.

(56) References Cited

U.S. PATENT DOCUMENTS

| 2012/0077075 A1 | | 3/2012 | Tani et al. | |
|---|---|---|---|---|
| 2012/0196172 A1 | * | 8/2012 | Maeda | ................ H01M 2/1673 429/139 |
| 2012/0321932 A1 | | 12/2012 | Ise et al. | |

FOREIGN PATENT DOCUMENTS

| JP | 2009123582 A | * | 6/2009 |
|---|---|---|---|
| JP | 2011-76838 A | | 4/2011 |
| JP | 2012-033399 A | | 2/2012 |
| JP | 2012-069378 A | | 4/2012 |
| WO | 2011/099224 A1 | | 8/2011 |

OTHER PUBLICATIONS

International Preliminary Report on Patentability, dated Dec. 2, 2014, issued by the International Searching Authority in counterpart Application No. PCT/JP2013/064972.
International Search Report for PCT/JP2013/064972 dated Aug. 13, 2013.
Communication dated Apr. 4, 2018, from the State Intellectual Property Office of People's Republic of China in counterpart Application No. 201610696639.7.

* cited by examiner

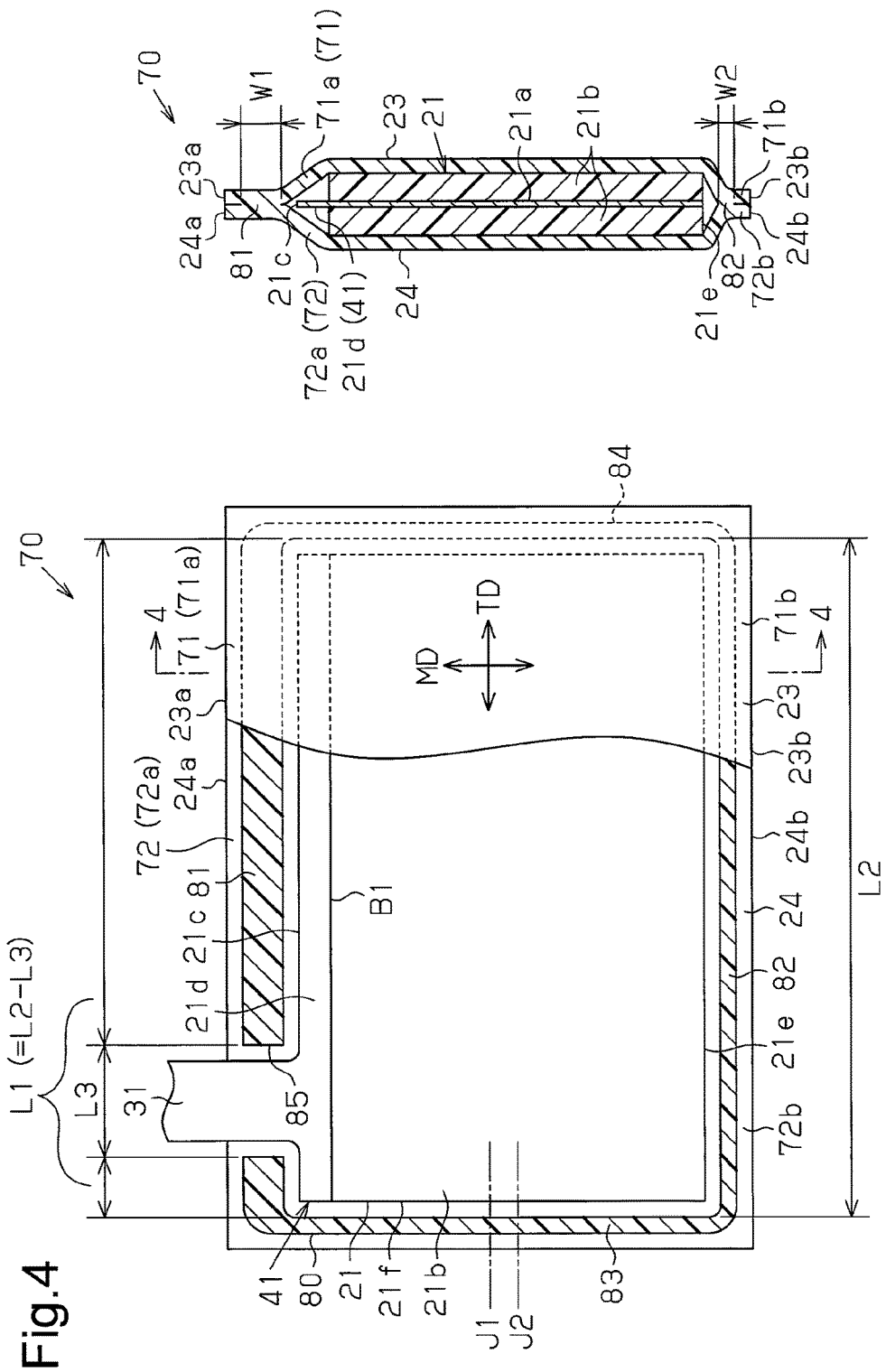

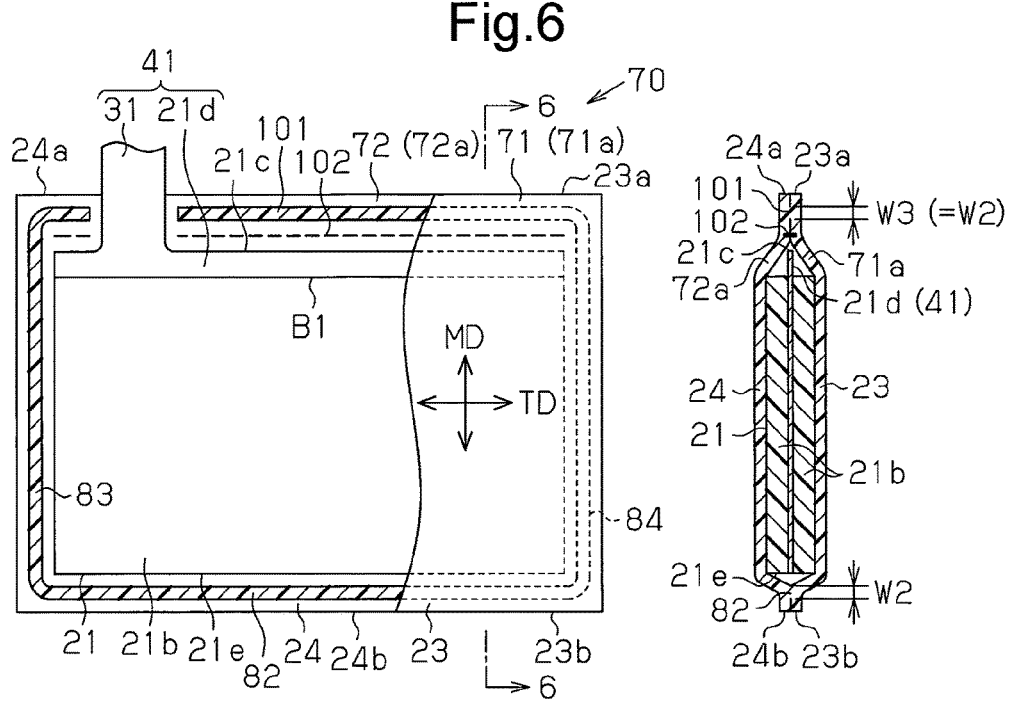
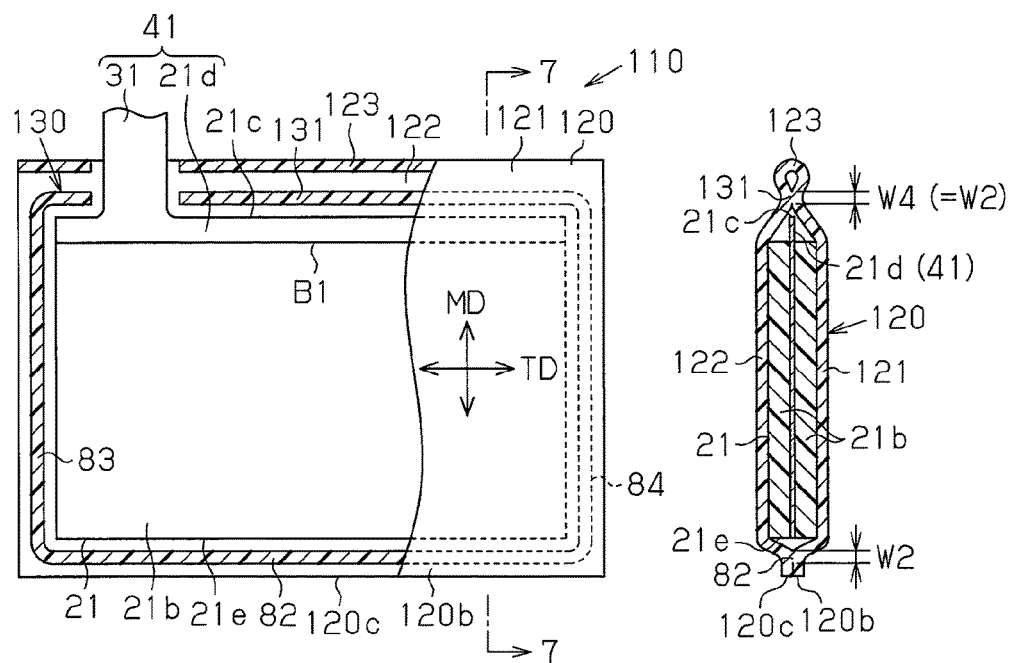

ELECTRICITY STORAGE DEVICE

CROSS REFERENCE TO RELATED APPLICATIONS

This application is a National Stage of International Application No. PCT/JP2013/064972 filed May 30, 2013, claiming priority based on Japanese Patent Application No. 2012-126458 filed Jun. 1, 2012, the contents of all of which are incorporated herein by reference in their entirety.

TECHNICAL FIELD

The present invention relates to an electricity storage device.

BACKGROUND ART

Vehicles, such as an electric vehicle (EV) and a plug in hybrid vehicle (PHV), include rechargeable batteries. The rechargeable battery serves as an electricity storage device, which stores electric power supplied to a drive motor. A rechargeable battery includes, for example, an electrode assembly in which positive and negative electrodes are stacked with separators located in between in a layered manner. The positive and negative electrodes each include an active material layer in which an active material is applied to a metal foil. It is known to manufacture such an electrode assembly by sandwiching a first electrode (positive or negative electrode) between two separators and by bonding the two separators to unify the first electrode and the two separators (e.g., refer to patent document 1).

PRIOR ART DOCUMENT

Patent Document

Patent Document 1: Japanese Laid-Open Patent Publication No. 2011-076838

SUMMARY OF THE INVENTION

A separator is formed from, for example, a resin such as polypropylene. Thus, when the internal temperature of the rechargeable battery increases for one reason or another, the separator is heated and thermally contracted. This may cause contact between the positive electrode and the negative electrode. Contact between the positive electrode and the negative electrode generates heat at the location of contact. Overheating may adversely affect the functions of the rechargeable battery.

It is an object of the present invention to provide an electricity storage device that is capable of controlling the amount of generated heat when positive and negative electrodes short-circuit due to thermal contraction of a separator.

To achieve the above object, an electricity storage device according to one aspect of the present invention includes a first electrode, a first separator portion, a second separator portion, and a second electrode. The first electrode includes a first metal foil and a first active material layer formed by applying a first active material to the first metal foil. The first electrode includes a first end portion and a second end portion located at an opposite side of the first end portion. The first end portion is free from the first active material and defines a first active material-free portion that exposes the first metal foil. The first active material layer extends from a border of the first active material layer and the first active material-free portion to the second end portion. The first separator portion covers a first surface of the first electrode. The second separator portion covers a second surface of the first electrode located at an opposite side of the first surface in a thicknesswise direction. The second electrode includes a second metal foil and a second active material layer formed by applying a second active material to the second metal foil. The second electrode includes a third end portion corresponding to the first end portion and a fourth end portion corresponding to the second end portion, which is located at an opposite side of the third end portion. The third end portion is free from the second active material and defines a second active material-free portion that exposes the second metal foil. The second active material layer extends from a border of the second active material layer and the second active material-free portion to the fourth end portion. The first electrode, the second electrode, the first separator portion, and the second separator portion are overlapped in a layered manner to form an electrode assembly. Each of the first separator portion and the second separator portion includes a strong bonding portion and a weak bonding portion that bond the first separator portion and the second separator portion. The strong bonding portion has a bonding strength that is strong relative to that of the weak bonding portion. The strong bonding portion is located in each of the first separator portion and the second separator portion at a section proximate to the first end portion and extends along the first end portion. The weak bonding portion is located in each of the first separator portion and the second separator portion at a section proximate to the second end portion and extends along the second end portion.

The above configuration restricts movement of the first electrode relative to the separator portion with the strong bonding portion, which is located in the section proximate to the first end portion and extends along the first end portion, and the weak bonding portion, which is located in the section proximate to the second end portion and extends along the second end portion. This limits extension of the first electrode beyond the separator portion and limits short-circuiting between the first and second electrodes.

When the temperature of the rechargeable battery increases for one reason or another and the separator portion thermally contracts, delamination occurs from the bonding of the weak bonding portion. This results in exposure occurring from the second end portion located at the opposite side of the first end portion, which includes the active material-free portion. Thus, the second end portion may contact the fourth end portion. In this case, the active material layers are formed on the second end portion and fourth end portion. It can thus be expected that the active material layers would contact each other. The amount of heat generated when the active material layers contact each other is smaller than the amount of heat generated when the metal foil contacts the active material layer. Therefore, when the separator portion thermally contracts, contact occurs from the active material layers, which generate a relatively small amount of heat. This reduces the amount of heat generated when the electrodes contact each other.

Preferably, a bonding area of the weak bonding portions is smaller than a bonding area of the strong bonding portions.

The above configuration employs the bonding area as a parameter for setting strong and weak bonding strengths. This defines the relative relationship of the bonding strength. Thus, the priority for delamination of the bonding of the weak bonding portion is ensured.

Preferably, the strong bonding portion and the weak bonding portion are each strip-shaped and each have a predetermined width in a first direction, which extends from the second end portion toward the first end portion. The width of the weak bonding portion is shorter than the width of the strong bonding portion.

The above configuration employs the widths (lengths) of the strong bonding portion and the weak bonding portion in the direction that extends from the first end portion toward the second end portion as a parameter for setting strong and weak bonding strengths. The pressure resistances of the strong bonding portion and the weak bonding portion with respect to contraction of the separator portion depend on the widths of the corresponding bonding portions. This allows delamination of the bonding to occur from the weak bonding portion when the separator portion contracts.

Preferably, the first separator portion and the second separator portion cover the first electrode so that a machine direction when manufacturing the first separator portion and the second separator portion extends in the first direction, which extends from the second end portion toward the first end portion.

In the above configuration, the MD direction (machine direction during manufacturing), in which the first and second separators has a tendency of contracting, extends in the first direction, which extends from the second end portion toward the first end portion. The TD direction (lateral direction), which is orthogonal to the MD direction and relatively resistant to the contraction, extends in the direction orthogonal to the first direction. This avoids a situation in which the separator portion contracts in the direction orthogonal to the first direction and exposes the active-material free portion. Thus, contact may be avoided between the active material-free portion and the active material layer.

Preferably, the first active material-free portion includes a first tab projecting from the first end portion. The second active material-free portion includes a second tab projecting from the third end portion. The first tab and the second tab each project in the first direction, which extends from the second end portion toward the first end portion. The strong bonding portion and the weak bonding portion extend opposing each other in the first direction.

In the above configuration, the strong bonding portion and the weak bonding portion extend opposing each other in the projecting direction of the tab (first direction). This restricts movement of the first electrode in the opposing direction of the bonding portions (first direction). Additionally, the tab is sandwiched by the strong bonding portion in the direction (TD direction) orthogonal to the opposing direction (projecting direction). This restricts movement of the first electrode in the direction orthogonal to the opposing direction.

The above configuration includes the weak bonding portion, from which delamination occurs. Thus, displacement of the first electrode is limited. This reduces the amount of heat generated as the electrodes contact each other when the separator portions thermally contract.

Preferably, the strong bonding portion and the weak bonding portion are welded to bond the first separator portion and the second separator portion to each other.

In the above configuration, the strong bonding portion and the weak bonding portion are welded to bond the first separator portion to the second separator portion. Thus, each bonding portion may be realized with a relatively simple configuration. Particularly, by adjusting the area that undergoes heat processing or the like, different bonding strengths may be easily set. This easily realizes two bonding portions having different bonding strengths.

Preferably, the electricity storage device is a rechargeable battery.

Preferably, the weak bonding portion includes a first bonding portion. The strong bonding portion includes the first bonding portion and a second bonding portion, of which type of bonding differs from the first bonding portion.

BRIEF DESCRIPTION OF THE DRAWINGS

FIG. 4 includes a front view of a positive electrode accommodator of FIG. 1 and a cross-sectional view of the positive electrode accommodator taken along line 4-4.

FIG. 6 includes a front view of a positive electrode accommodator according to a second embodiment of the present invention and a cross-sectional view of the positive electrode accommodator taken along line 6-6.

FIG. 7 includes a front view of a positive electrode accommodator according to a third embodiment of the present invention and a cross-sectional view of the positive electrode accommodator taken along line 7-7.

DETAILED DESCRIPTION OF THE PREFERRED EMBODIMENTS

First Embodiment

Figure 1:
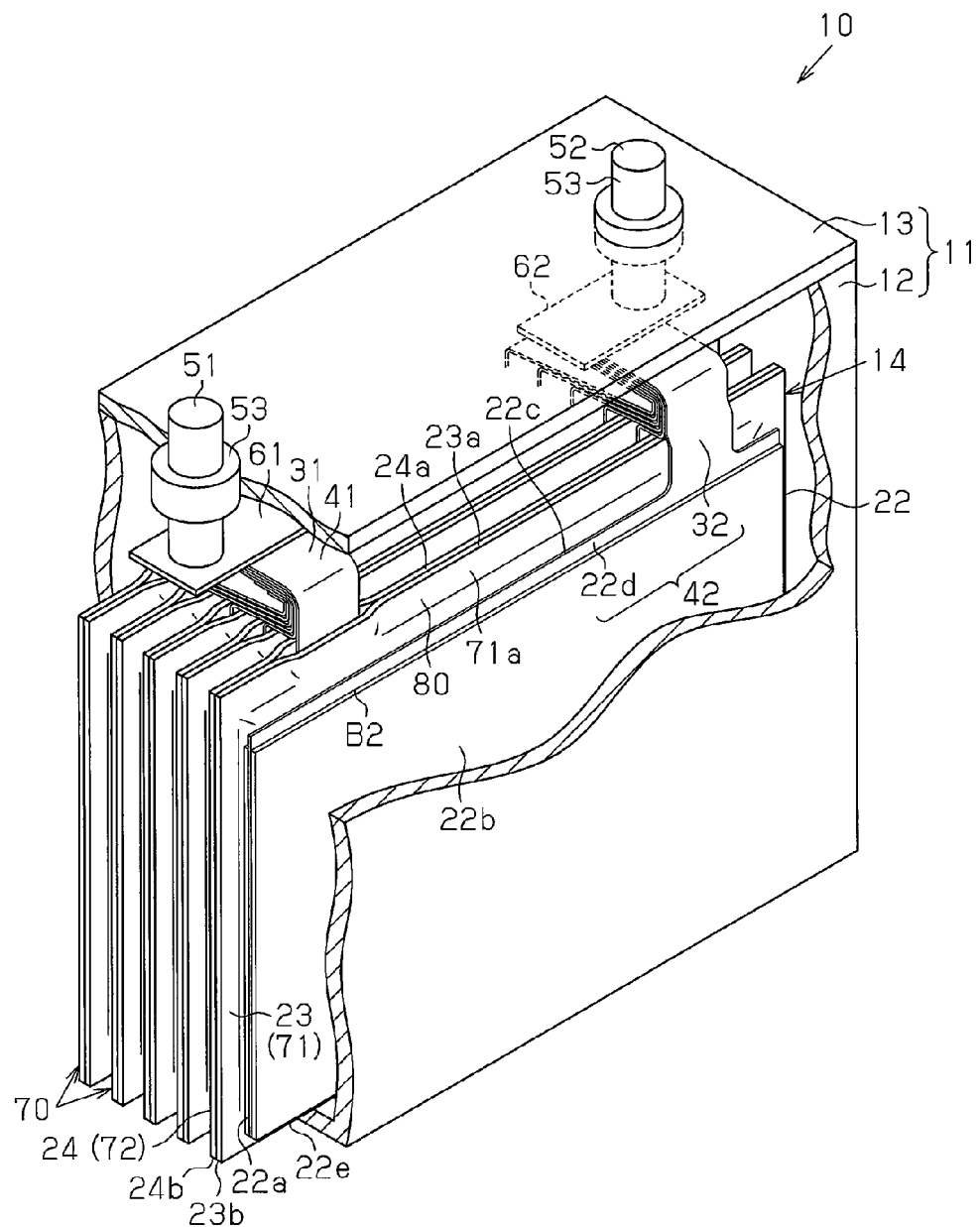
FIG. 1 is a perspective view of a rechargeable battery according to one embodiment of the present invention.
Figure 5A:
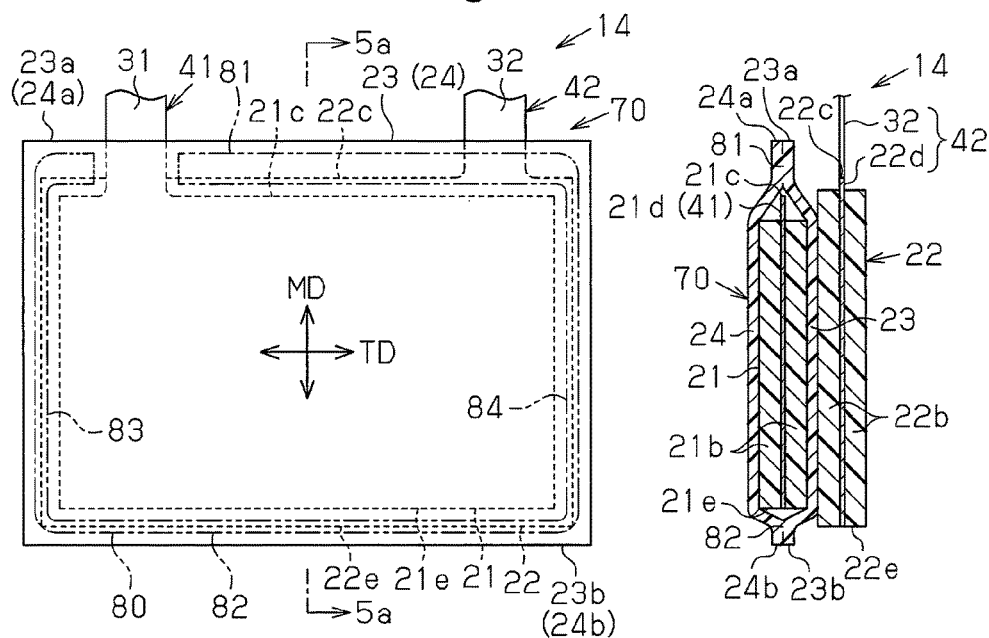
FIG. 5A is a front view of the electrode assembly of FIG. 1 and a cross-sectional view of the electrode assembly taken along line 5a-5a before the separator thermally contracts.
Figure 5B:
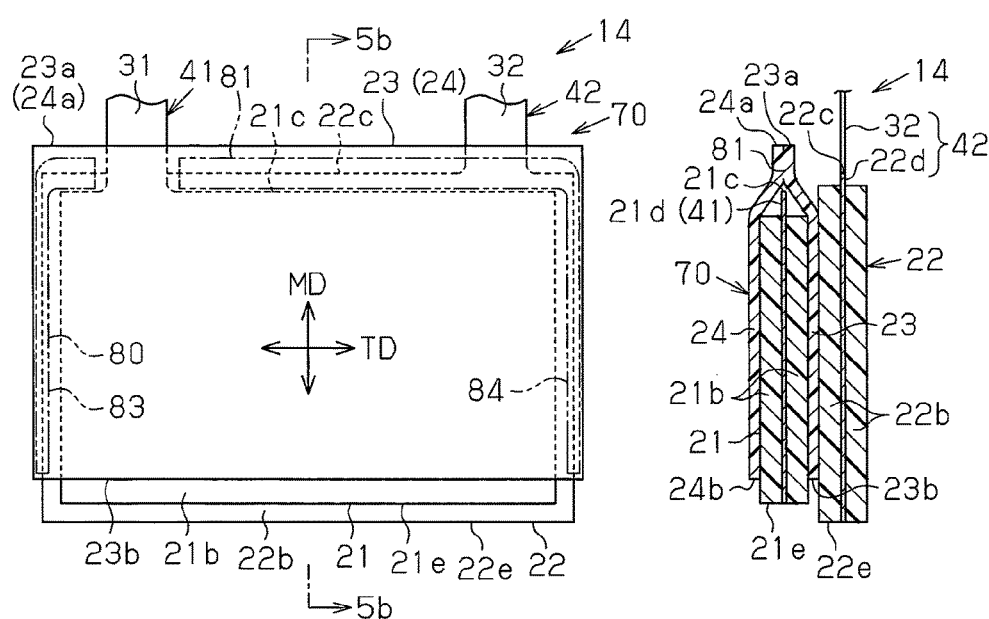
FIG. 5B is a front view of the electrode assembly of FIG. 1 and a cross-sectional view of the electrode assembly taken along line 5b-5b after the separator thermally contracts.

An electricity storage device of the present invention will now be described with reference to FIGS. 1 to 5B. The electricity storage device is installed in a vehicle (passenger vehicle or industrial vehicle) and used to drive a drive motor (electric motor) installed in the vehicle. FIGS. 1, 3 and 4 are partially cutout views. In FIGS. 5A and 5B, a welding portion 80 is indicated by double-dashed lines. Additionally, in FIGS. 5A and 5B, to facilitate understanding, FIGS. 5A and 5B show only a portion of an electrode assembly 14, that is, only one positive electrode accommodator 70 and one negative electrode 22.

Referring to FIG. 1, a rechargeable battery 10, which serves as an electricity storage device, is a lithium-ion rechargeable battery. The rechargeable battery 10 includes a metal case 11, which forms the shell of the rechargeable battery 10. The case 11 includes a tetragonal box-like container 12 and a rectangular plate-like cover 13, which closes an opening of the container 12. The shell of the rechargeable battery 10 is cuboid.

The case 11 accommodates the electrode assembly 14 and an electrolytic solution (not shown), which serves an electrolyte. As shown in FIG. 3, a positive electrode 21, serving as a first electrode, and a negative electrode 22, serving as a second electrode, are stacked in a layered manner with separators 23 and 24 located in between to form the electrode assembly 14. Each of the separators 23 and 24 is formed from a porous film that allows for the passage of ions (lithium ions) related to electrical conduction. The separators 23 and 24 sandwiching the positive electrode 21 or the negative electrode 22 are paired. The electrodes 21 and 22 and the two separators 23 and 24 each are tetragonal (more specifically, rectangular) sheet and similar to one another.

As shown in FIG. 3, the positive electrode 21 includes a rectangular positive metal foil 21a (e.g., aluminum foil) and a positive active material layer 21b. A positive active material is applied to sheet surfaces (front and rear surfaces) of the positive metal foil 21a to form the positive active material layer 21b, which serves as a first active material layer. The sheet surface of the positive electrode 21 (positive metal foil 21a) has a predetermined width in a direction orthogonal to the extending direction of a first end portion 21c, which is an end of the positive electrode 21, and includes a positive active material-free edge 21d, which extends along the first end portion 21c. The positive active material layer 21b is formed on a portion of the sheet surface of the positive electrode 21 excluding the positive active material-free edge 21d. Thus, the positive active material layer 21b is also formed on a second end portion 21e located at the opposite side of the first end portion 21c. In other words, the positive active material layer 21b extends from a border B1 of the positive active material layer 21b and the positive active material-free edge 21d to the second end portion 21e.

Figure 2:
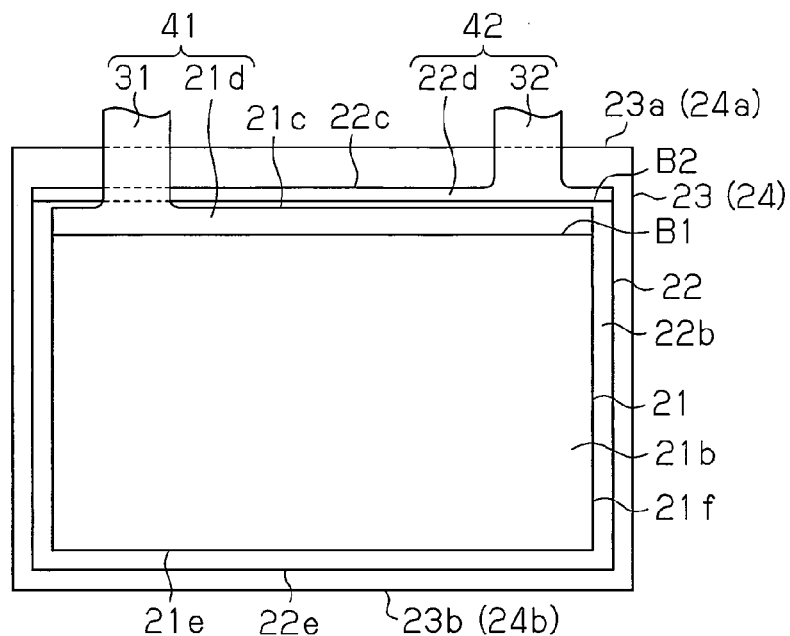
FIG. 2 is a schematic view showing a situation in which a separator, a negative electrode, and a positive electrode of FIG. 1 are sequentially stacked.
Figure 3:
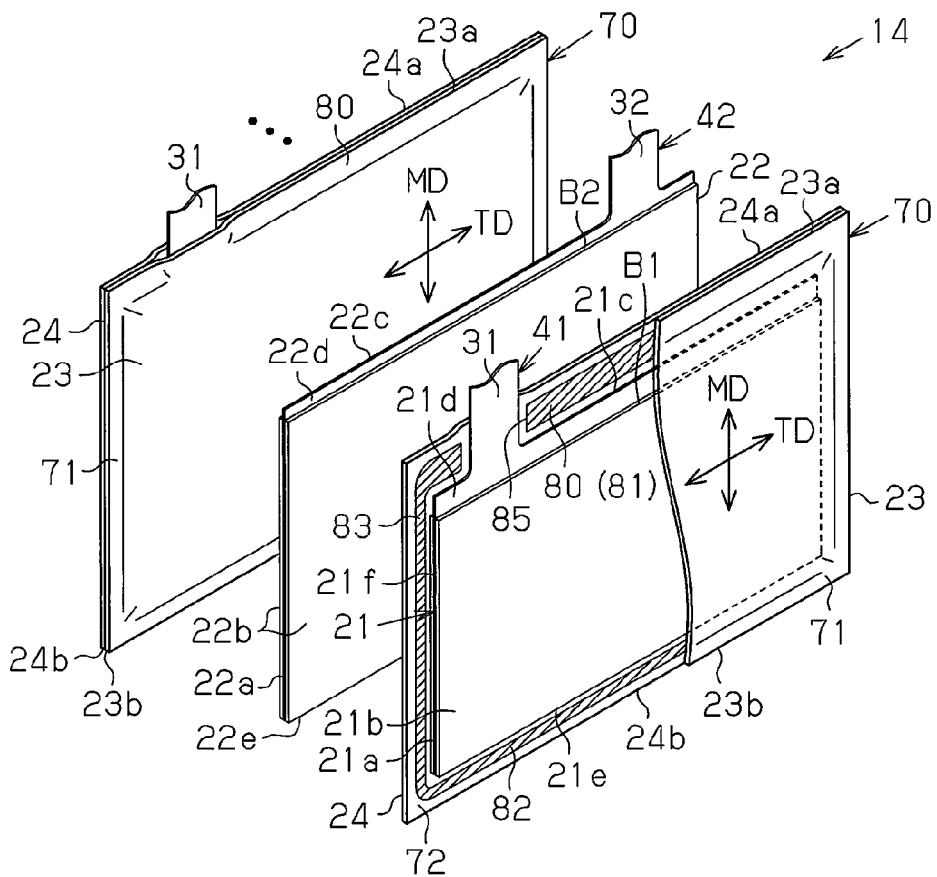
FIG. 3 is an exploded perspective view of an electrode assembly of FIG. 1.

As shown in FIG. 2, the negative electrode 22 is slightly larger than the positive electrode 21. More specifically, the length of two adjacent sides (long and short sides) of the negative electrode 22, that is, the length of the negative electrode 22 in two directions that are orthogonal to the thicknesswise direction, is set to be greater than the length of two adjacent sides (long and short sides) of the positive electrode 21, that is, the length of the positive electrode 21 in two directions that are orthogonal to the thicknesswise direction.

As shown in FIG. 3, the negative electrode 22 includes a rectangular negative metal foil 22a (e.g., copper foil) and a negative active material layer 22b. The negative metal foil 22a is slightly larger than the positive metal foil 21a. A negative active material is applied to sheet surfaces (front and rear surfaces) of the negative metal foil 22a to form the negative active material layer 22b, which serves as a second active material layer. The sheet surface of the negative electrode 22 (negative metal foil 22a) has a predetermined width in a direction orthogonal to the extending direction of a third end portion 22c, which is an end of the negative electrode 22, and includes a negative active material-free edge 22d, which extends along the third end portion 22c. The negative active material layer 22b is formed on a portion of the sheet surface of the negative electrode 22 excluding the negative active material-free edge 22d. Thus, the negative active material layer 22b is also formed on a fourth end portion 22e located the opposite side of the third end portion 22c. In other words, the negative active material layer 22b extends from a border B2 of the negative active material layer 22b and the negative active material-free edge 22d to the fourth end portion 22e. As shown in FIG. 2, the negative active material layer 22b is larger than the positive active material layer 21b so that the negative active material layer 22b can entirely cover the positive active material layer 21b.

As shown in FIG. 2, the separators 23 and 24, which have identical shapes, are slightly larger than the positive electrode 21 and the negative electrode 22. More specifically, the length of two adjacent sides (long and short sides) of each of the separators 23 and 24, that is, the length of each of the separators 23 and 24 in two directions that are orthogonal to the thicknesswise direction, is set to be greater than the length of the positive electrode 21 and the negative electrode 22 in two directions (the length of long and short sides). That is, each of the separators 23 and 24 is large enough to cover the sheet surfaces of the electrodes 21 and 22 (active material layers 21b and 22b and active material-free edges 21d and 22d) when overlapped with the sheet surfaces.

The separators 23 and 24 are identical in shape and formed from a polyolefin fine porous material, for example, polyethylene (PE), polypropylene (PP), polyethylene terephthalate (PET), or the like.

Each of the separators 23 and 24 is manufactured by cutting a sheet of a separator material. The material of the separator is manufactured with a predetermined degree of porosity by forming pores at the same time as when extending the separator material or in a different process. Thus, each of the separators 23 and 24 has fibers oriented in a machine direction during the manufacturing process, that is, the MD direction (refer to FIG. 3). Therefore, the separators 23 and 24 are more vulnerable to thermal contraction in the MD direction than in a lateral direction orthogonal to the MD direction, that is, the TD direction (refer to FIG. 3). Thus, each of the separators 23 and 24 extends in the MD direction, in which thermal contraction is relatively large, and the TD direction, in which thermal contraction is relatively small.

As shown in FIG. 3, the separators 23 and 24 are overlapped with and stacked on the positive electrode 21 when the TD direction is aligned with the longitudinal direction of the positive active material-free edge 21d (first end portion 21c of the positive electrode 21) and the MD direction is aligned with a direction orthogonal to the longitudinal direction of the positive active material-free edge 21d.

In the electrode assembly 14, the positive active material layer 21b is entirely covered by the negative active material layer 22b, and the positive electrode 21 and the negative electrode 22 are covered by the separators 23 and 24. In this case, the region where the positive active material layer 21b is opposed to the negative active material layer 22b contributes to charging and discharging.

The first end portion 21c of the positive electrode includes a positive electrode tab 31, which is formed by projecting a portion of the first end portion 21c to serve as a first tab. The positive electrode tab 31 projects in a direction extending from the second end portion 21e toward the first end portion 21c (first direction), that is, a direction extending away from the first end portion 21c. The positive electrode tab 31 is free from the positive active material. The positive metal foil 21a is exposed on the positive electrode tab 31. The positive electrode tab 31 and the positive active material-free edge 21d form a positive active material-free portion 41. The positive active material-free portion 41 is formed on the first end portion 21c of the positive electrode 21. The positive active material-free portion 41 is free from the positive active material layer 21b. The positive metal foil 21a is exposed in the positive active material-free portion 41.

In the same manner, the third end portion 22c of the negative electrode 22 includes a negative electrode tab 32, which is formed by projecting a portion of the third end portion 22c to serve as a second tab. The negative electrode tab 32 projects in a direction extending from the fourth end portion 22e toward the third end portion 22c (same direction as the first direction), that is, a direction extending away from the third end portion 22c. The negative electrode tab 32 is free from the negative active material. The negative metal foil 22a is exposed on the negative electrode tab 32. The negative electrode tab 32 and the negative active material-free edge 22d form a negative active material-free portion 42. The negative active material-free portion 42 is formed on the third end portion 22c of the negative electrode 22. The negative active material-free portion 42 is free from the negative active material layer 22b. The negative metal foil 22a is exposed in the negative active material-free portion 42.

Each length in two directions (length of long and short sides) of the positive electrode 21 excludes the length of the positive electrode tab 31. Each length in two directions (length of long and short sides) of the negative electrode 22 excludes the length of the negative electrode tab 32.

The projecting direction of the positive electrode tab 31 is orthogonal to the longitudinal direction of the positive active material-free edge 21d (first end portion 21c of the positive electrode 21). A direction orthogonal to the projecting direction of the positive electrode tab 31 is parallel to the longitudinal direction of the positive active material-free edge 21d (longitudinal direction of the positive electrode 21). In this case, the separators 23 and 24 are overlapped with the positive electrode 21 when the MD direction is aligned with the projecting direction and the TD direction is aligned with a direction orthogonal to the MD direction (direction parallel the projecting direction).

As shown in FIG. 3, the electrodes 21 and 22 are stacked so that the active material-free portions 41 and 42 are located in the same region of the electrode assembly 14. In other words, the first end portion 21c and the third end portion 22c are stacked in correspondence with each other, and the second end portion 21e and the fourth end portion 22e are stacked in correspondence with each other. More specifically, the electrodes 21 and 22 are stacked so that the first end portion 21c and the third end portion 22c are located in the same region of the electrode assembly 14 in a direction extending from the second end portion 21e toward the first end portion 21c (first direction), and the second end portion 21e and the fourth end portion 22e are located in the same region of the electrode assembly 14 in the direction extending from the second end portion 21e toward the first end portion 21c (first direction).

Further, as shown in FIG. 3, the electrodes 21 and 22 are overlapped so that among the tabs 31 and 32, those having the same polarity are arranged in a line in the stacking direction of the electrodes 21 and 22, while those having different polarities are not arranged in a line in the stacking direction of the electrodes 21 and 22. As shown in FIG. 1, the positive electrode tabs 31 are gathered to be located at one end in the stacking direction of the electrode assembly 14. The gathered positive electrode tabs 31 are folded toward the opposite side of the above-described end. In the same manner, the negative electrode tabs 32 are gathered to be located at one end in the stacking direction of the electrode assembly 14. The gathered negative electrode tabs 32 are folded toward the opposite side of the above-described end. The electrode assembly 14 is accommodated in the case 11 so that the cover 13 is opposed to a section of the electrode assembly 14 in which the tabs 31 and 32 are formed.

As shown in FIG. 1, the rechargeable battery 10 includes a positive terminal 51 and a negative terminal 52, which are connectable from the outside of the case 11, and a positive conductive member 61 and a negative conductive member 62, which serve as conductive members. Each of the positive conductive member 61 and the negative conductive member 62 connects the terminals 51 and 52 to the tabs 31 and 32 of the same polarity.

The positive terminal 51, which is insulated from the case 11 by an insulative ring 53, extends through the case 11. The positive terminal 51 includes a section exposed outside the case 11 and a section located inside the case 11. The positive conductive member 61, which is formed by a metal plate, includes one plate surface and another end surface. One plate surface contacts the outermost one of the positive electrode tabs 31. The other plate surface contacts the end of the positive terminal 51 located in the case 11. The locations of contact are joined (welded) together.

In the same manner, the negative terminal 52, which is insulated from the case 11 by the insulative ring 53, extends through the case 11. The negative conductive member 62 is arranged in contact with the negative terminal 52 and the negative electrode tab 32. The locations of contact are joined (welded) together.

Accordingly, electric power may be drawn from the electrode assembly 14 out of the case 11 and supplied to the electrode assembly 14 through the terminals 51 and 52.

As shown in FIG. 2, the electrode assembly 14 has a layered form by alternately stacking the negative electrode 22 and the positive electrode accommodator 70, which is a unit of the positive electrode 21 and the separators 23 and 24. In this structure, the stacking of the positive electrode accommodators 70 results in one of the separators 23 and 24 being located between the electrodes 21 and 22. This reduces the number of the stacking steps compared with a structure that sequentially stacks the positive electrode 21, the negative electrode 22, and the separators 23 and 24.

The positive electrode accommodator 70 will now be described in detail.

The positive electrode accommodator 70 is unified by sandwiching the positive electrode 21 between the separators 23 and 24. In this case, a first separator 23 covers a first surface (positive active material layer 21b and positive active material-free edge 21d) of the positive electrode 21, and a second separator 24 covers a second surface of the positive electrode 21 that is located at the opposite side of the first surface in the thicknesswise direction.

Each of the separators 23 and 24 is larger than the positive electrode 21 so that the positive electrode 21 (excluding positive electrode tab 31) can be covered. In the positive electrode accommodator 70, each of the separators 23 and 24 partially extends beyond a peripheral portion 21f of the positive electrode 21 in a planar direction of the positive electrode 21. In other words, the separators 23 and 24 respectively include extensions 71 and 72, which extend beyond the peripheral portion 21f of the positive electrode 21 in the planar direction.

The extensions 71 and 72 are formed to extend along peripheral edges of the corresponding separators 23 and 24. More specifically, the extensions 71 and 72 are formed at opposite ends of the positive electrode 21 in the projecting direction (MD direction, direction orthogonal to the longitudinal direction) of the positive electrode tab 31 and at opposite ends of the positive electrode 21 in the direction orthogonal to the projecting direction (TD direction, longitudinal direction).

As shown in FIG. 4, the positive electrode accommodator 70 includes a welding portion 80, which serves as a bonding portion that bonds the separators 23 and 24 to each other.

Heat processing is performed on the extensions 71 and 72 to form the welding portion 80. The welding portion 80 unifies the separators 23 and 24.

The welding portion 80 is formed along the peripheral edges of the separators 23 and 24 in the entire area of the extensions 71 and 72 except where the positive electrode tab 31 is located. The welding portion 80 surrounds the positive electrode 21. More specifically, the welding portion 80 includes a first welding portion 81 and a second welding portion 82, which oppose each other and extend in the projecting direction (first direction) of the positive electrode tab 31, and a third welding portion 83 and a fourth welding portion 84, which oppose each other and extend in the direction orthogonal to the projecting direction (direction orthogonal to the first direction).

The first welding portion 81 and the second welding portion 82 have different welding strengths (bonding strengths). This aspect will now be described in detail.

As shown in FIG. 4, the first welding portion 81 is located in the proximity of the positive active material-free portion 41 of the positive electrode 21. More specifically, the first welding portion 81 is located between the first end portion 21c of the positive electrode 21, which includes the positive active material-free edge 21d, and first end portions 23a and 24a of the separators 23 and 24 that are located in the proximity of the first end portion 21c of the positive electrode 21. The first welding portion 81 extends in the longitudinal direction of the first end portion 21c of the positive electrode 21 (first end portions 23a and 24a of the separators 23 and 24) excluding a weld-free portion 85 located at a position overlapped with the positive electrode tab 31. The positive electrode tab 31 is sandwiched by the first welding portion 81 in the direction (TD direction) orthogonal to the projecting direction of the positive electrode tab 31.

The second welding portion 82 and the first welding portion 81 are located at opposite sides of the positive electrode accommodator 70 in the projecting direction of the positive electrode tab 31. The second welding portion 82 is opposed to the first welding portion 81. More specifically, the second welding portion 82 is located between the second end portion 21e, which is located at the opposite side of the first end portion 21c of the positive electrode 21 in the projecting direction of the positive electrode tab 31, and second end portions 23b and 24b of the separators 23 and 24 that are located in the proximity of the second end portion 21e of the positive electrode 21. The second welding portion 82 extends in the longitudinal direction of the second end portion 21e of the positive electrode 21 (second end portions 23b and 24b of the separators 23 and 24). The projecting direction of the positive electrode tab 31 corresponds to the opposing direction in which the welding portions 81 and 82 are opposed to each other. The welding portions 81 and 82 are located on opposite ends of each of the separators 23 and 24, more specifically, in the proximity of the opposite ends, in the MD direction.

As shown in FIG. 3, the active material-free portions 41 and 42 are located in the same region of the electrode assembly 14. This indicates that the first welding portion 81 is located in the proximity of the active material-free portions 41 and 42. The first welding portion 81 extends in the longitudinal direction of the first end portion 21c and the third end portion 22c. The second end portion 21e and the fourth end portion 22e, which are respectively located at sides of the electrodes 21 and 22 opposite to the active material-free portions 41 and 42, are located in the same region of the electrode assembly 14. This indicates that the second welding portion 82 is located in the proximity of the second end portion 21e and the fourth end portion 22e. The second welding portion 82 extends in the longitudinal direction of the second end portion 21e and the fourth end portion 22e.

As shown in FIG. 4, a welding area of the second welding portion 82 is defined by multiplying the length L2 of the second welding portion 82 in the direction orthogonal to the opposing direction (TD direction, direction orthogonal to the projecting direction) by the length W2 of the second welding portion 82 in the opposing direction (hereinafter, simply referred to as the width W2 of the second welding portion 82) (L2×W2). A welding area of the first welding portion 81 is defined by multiplying the length L1 of the first welding portion 81 in the direction orthogonal to the opposing direction by the length W1 of the first welding portion 81 in the opposing direction (hereinafter, simply referred to as the width W1 of the first welding portion 81).

In this structure, the welding area (L2×W2) of the second welding portion 82 is smaller than the welding area (L1× W1) of the first welding portion 81. More specifically, the length L2 of the second welding portion 82 in the direction orthogonal to the opposing direction is longer by the length L3 of the weld-free portion 85 (L1=L2−L3) than the length L1 of the first welding portion 81 in the direction orthogonal to the opposing direction. The width W2 of the second welding portion 82 is shorter than the width W1 of the first welding portion 81. More specifically, the width W2 of the second welding portion 82 is shorter than the width W1 of the first welding portion 81 taking into consideration the length L3 of the weld-free portion 85 so that the welding area of the second welding portion 82 is smaller than the welding area of the first welding portion 81. That is, the widths W1 and W2 are set to satisfy a relational expression of (W2/W1)<(L1/L2). Therefore, the welding strength of the second welding portion 82 is weaker (lower) than that of the first welding portion 81. The first welding portion 81 corresponds to a "strong bonding portion". The second welding portion 82 corresponds to a "weak bonding portion".

The opposing direction corresponds to a thermal contraction direction in which the separators 23 and 24 thermally contract. Thus, the widths W1 and W2 of the welding portions 81 and 82 are lengths of the welding portions 81 and 82 in the thermal contraction direction. This indicates that the widths W1 and W2 are each one of the parameters that determine the pressure resistance of the separators 23 and 24 with respect to thermal contraction.

As shown in FIG. 4, a first center line J1 is defined as a line that lies along the middle of the separators 23 and 24 in the opposing direction and extends in the direction orthogonal to the opposing direction. A second center line J2 is defined as a line that lies along the middle of the positive electrode 21 in the opposing direction and extends in the direction orthogonal to the opposing direction. In this case, the positive electrode 21 is arranged so that the second center line J2 is shifted toward the second end portions 23b and 24b of the separators 23 and 24 from the first center line J1. Thus, in the extensions 71 and 72, the area (region) of the first extensions 71a and 72a, which includes the first welding portion 81, is larger than the second extensions 71b and 72b, which include the second welding portion 82. This ensures that the first welding portion 81 has a larger area than the second welding portion 82.

Heat processing is performed on the separators 23 and 24 and the positive electrode 21, which are arranged in the above manner, to form the welding portions 81 and 82. In this case, the heat processing region, that is, the region that can be welded when undergoing heat processing, differs between the first welding portion 81 and the second welding portion 82. This easily forms between the first welding portion 81 and the second welding portion 82, which have different welding areas.

The operation of the rechargeable battery 10 of the present embodiment will now be described when the separators 23 and 24 thermally contract.

As shown in FIG. 4, when the positive electrode 21 is surrounded by the welding portion 80, the displacement of the positive electrode 21 is limited relative to the separators 23 and 24. This limits the occurrence of situations in which the positive electrode 21 extends beyond the separators 23 and 24.

As shown in FIG. 5A, in the structure in which the positive electrode accommodator 70 is overlapped with the negative electrode 22, when the temperature of the separators 23 and 24 reaches the heat shrinkage temperature due to an increase in the temperature of the rechargeable battery 10 or the like, the separators 23 and 24 thermally contract. In this case, the second welding portion 82 has a weaker welding strength than the first welding portion 81. Thus, delamination of the bonding (welding) occurs from the second welding portion 82. As shown in FIG. 5B, this exposes the second end portion 21e of the positive electrode 21. Thus, the second end portion 21e of the positive electrode 21 and the fourth end portion 22e of the negative electrode 22 become exposed. The active material layers 21b and 22b are respectively formed on the second end portion 21e and the fourth end portion 22e. Thus, contact of the two end portions would result in contact of the active material layers 21b and 22b. The amount of heat generated when such contact occurs is less, by an amount corresponding to the resistance of the active material layers 21b and 22b that is higher than that of the active material-free portions 41 and 42, than the amount of heat generated when the positive active material-free portion 41 contacts the negative active material layer 22b or when the negative active material-free portion 42 contacts the positive active material layer 21b. This reduces the amount of heat generated when the positive electrode 21 contacts (short-circuits) the negative electrode 22.

Particularly, when the separators 23 and 24 are overlapped with the positive electrode 21, the MD direction, in which a relatively large amount of thermal contraction occurs, coincides with the opposing direction (first direction) of the welding portions 81 and 82. The welding portions 83 and 84 are opposed in the TD direction, in which a relatively small amount of thermal contraction occurs. Therefore, the thermal contraction force applied to the welding portions 83 and 84 is small compared with the force applied to the welding portions 81 and 82. Thus, the welding portions 83 and 84 resist breakage even when thermal contraction occurs. This limits the exposure of the positive active material-free portion 41, more specifically, the end portion of the positive active material-free edge 21d in the longitudinal direction, and limits contact of the positive active material-free portion 41 and the negative electrode 22.

Accordingly, the present embodiment has the advantages described below.

(1) The positive electrode accommodator 70 is overlapped with the negative electrode 22 in a layered manner to form the electrode assembly 14. The separators 23 and 24 are bonded (welded) to each other with the positive electrode 21, which includes the positive active material-free portion 41 on the first end portion 21c, located in between to unify the positive electrode accommodator 70. This limits extension of the positive electrode 21 beyond the separators 23 and 24 and contact of the electrodes 21 and 22.

In this structure, the first welding portion 81 is located on the separators 23 and 24 proximate to the first end portion 21c of the positive electrode 21, and the second welding portion 82 is located on the separators 23 and 24 proximate to the second end portion 21e of the positive electrode 21. The welding strength of the second welding portion 82 is weaker than that of the first welding portion 81. Thus, delamination of the bonding occurs from the second welding portion 82 when the separators 23 and 24 thermally contract for one reason or another, and exposes the second end portion 21e, which is located in the proximity of the second welding portion 82. Thus, the second end portion 21e and the fourth end portion 22e may become exposed. In this case, the active material layers 21b and 22b are respectively formed on the second end portion 21e and the fourth end portion 22e. Thus, the active material layers 21b and 22b may contact each other. The amount of heat generated when the active material layers 21b and 22b contact each other is less than the amount of heat generated when the metal foil contacts the active material layer. This reduces the amount of heat generated when the electrodes 21 and 22 contact each other.

More specifically, delamination of the bonding of the first welding portion 81 would expose the entire positive active material-free portion 41 and the positive active material layer 21b. This may easily cause contact of the positive active material-free portion 41 and the negative active material layer 22b or contact of the positive active material layer 21b and the negative active material-free portion 42. The resistance generated when such contact occurs is small compared with the resistance generated when the active material layers 21b and 22b contact each other. Thus, the current easily increases. Consequently, the amount of heat generation may be increased when such contact occurs.

In contrast, in the present embodiment, the thermal contraction of the separators 23 and 24 causes delamination from the bonding of the second welding portion 82 located at the opposite side of the first welding portion 81, which includes the active material-free portions 41 and 42. Thus, contact occurs from the active material layers 21b and 22b, which generate relatively small amounts of heat. This reduces the amount of heat generated when the electrodes 21 and 22 contact each other.

(2) The separators 23 and 24 are welded to be bonded to each other. Thus, the separators 23 and 24 may be bonded to each other by undergoing heat processing, which is a relatively simple process. Further, the welding areas (widths W1 and W2) of the welding portions 81 and 82 may be adjusted by adjusting the size of the heat processing region. This realizes the welding portions 81 and 82, which have different bonding strengths, in a relatively simple manner.

(3) The welding area of the second welding portion 82 is set to be smaller than that of the first welding portion 81. This allows the second welding portion 82 to have a lower welding strength weaker than the first welding portion 81. This ensures that delamination occurs from the bonding of the second welding portion 82.

(4) The widths W1 and W2 of the welding portions 81 and 82 are each one of the parameters used to determine the pressure resistance of the separators 23 and 24 with respect to thermal contraction. In this structure, the width W2 of the second welding portion 82 is set to be shorter than the width W1 of the first welding portion 81. This ensures that delamination occurs from the bonding of the second welding portion 82 when the separators 23 and 24 thermally contract.

Second Embodiment

The present embodiment differs from the first embodiment in the structure for setting strong and weak bonding strengths. The difference will now be described in detail. Like or same reference numerals are given to those components that are the same as the corresponding components of the first embodiment. Such components will not be described in detail.

As shown in FIG. 6, the width W2 of the second welding portion 82 is the same as the width W3, which is the length of a first welding portion 101 of the present embodiment in the opposing direction. A sewn portion 102 is located in a section of the separators 23 and 24 proximate to the positive active material-free portion 41, more specifically, the first extensions 71a and 72a. In addition to the first welding portion 101, the sewn portion 102 bonds the separators 23 and 24. The sewn portion 102, which is arranged between the first welding portion 101 and the first end portion 21c of the positive electrode 21, extends along the first extensions 71a and 72a (first end portion 21c of the positive electrode 21) excluding a portion corresponding to the positive electrode tab 31. This bonds the first extensions 71a and 72a. In the present embodiment, the sewn portion 102 and the first welding portion 101 correspond to the "strong bonding portion".

When the width W2 is the same as the width W3, the welding area of the first welding portion 101, which extends avoiding the positive electrode tab 31, is smaller than that of the second welding portion 82. However, the bonding strength of the sewn portion 102 is set to be greater than the difference in the bonding strength, which corresponds to the difference in the welding area, so that the bonding strength at the proximity of the positive active material-free portion 41 is greater (stronger) than that of the opposite side.

The operation of the present embodiment will now be described.

In addition to the first welding portion 101, the sewn portion 102 is located in the proximity of the positive active material-free portion 41. Thus, the bonding strength of the positive active material-free portion 41 (bonding strength of the first welding portion 101 and the sewn portion 102) is greater than the bonding strength at the opposite side of the positive active material-free portion 41 (bonding strength of the second welding portion 82). It can therefore be expected that thermal contraction of the separators 23 and 24 causes delamination from the bonding of the second welding portion 82, which is located at the opposite side of the proximity of the positive active material-free portion 41. Accordingly, advantage (1) of the first embodiment may be obtained.

In the present embodiment, the sewn portion 102 is arranged between the first welding portion 101 and the first end portion 21c of the positive electrode 21. However, there is no limit to such a configuration. For example, the sewn portion 102 may be arranged between the first welding portion 101 and the first end portions 23a and 24a of the separators 23 and 24.

The specific form of the sewn portion is not limited as long as the bonding strength at the proximity of the positive active material-free portion 41 is greater than the bonding strength at the opposite side. For example, the sewn portion may be arranged in a portion of the first extensions 71a and 72a.

Third Embodiment

The present embodiment differs from the first embodiment in the structure for setting strong and weak bonding strengths. The difference will now be described in detail. Like or same reference numerals are given to those components that are the same as the corresponding components of the first embodiment. Such components will not be described in detail.

Figure 8A:
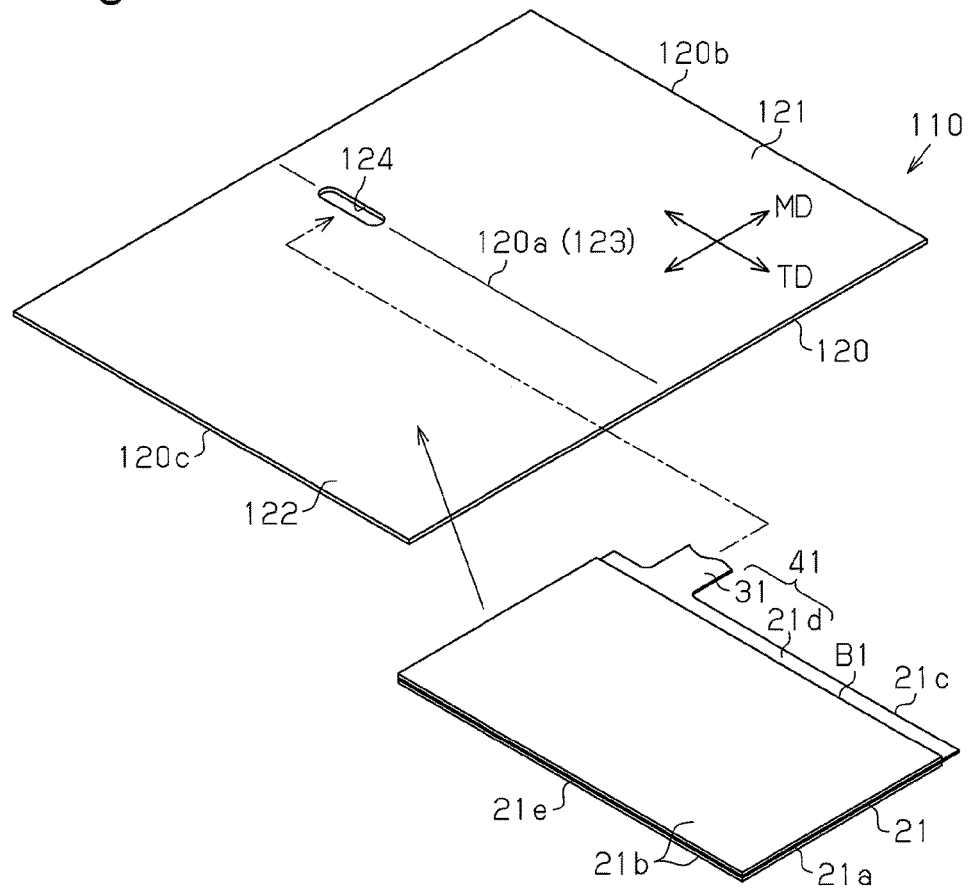
FIGS. 8A and 8B are each a perspective view illustrating a process for manufacturing the positive electrode accommodator of FIG. 7.

As shown in FIGS. 7 and 8, a tetragonal sheet-like separator 120 is folded and the positive electrode is sandwiched in the folded separator 120 to form a positive electrode accommodator 110 of the present embodiment. More specifically, as shown in FIG. 8A, the separator 120 includes a first separator portion 121 and a second separator portion 122, which are continuous with a folded side 120a located in between. The folded side 120a forms a folded portion 123. Each of the separators 121 and 122 is large enough to cover the positive electrode 21 (positive active material layer 21b and positive active material-free edge 21d). More specifically, the first and second separator portions 121 and 122 of the third embodiment have two adjacent sides (long and short sides), the length of which is set to be the same as that of two adjacent sides (long and short sides) of the separators 23 and 24 of the first and second embodiments. The separator 120 is formed so that the direction orthogonal to the folded side 120a is the MD direction and the direction along the folded side 120a is the TD direction.

The separator 120 includes a through hole 124. The positive electrode tab 31 is insertable through the through hole 124. The through hole 124 is formed in a location lying along the folded side 120a. The through hole 124 is formed in a location where the positive electrode tab 31 is located when the positive electrode 21 is arranged on the second separator portion 122 and covered by the second separator portion 122.

Figure 8B:
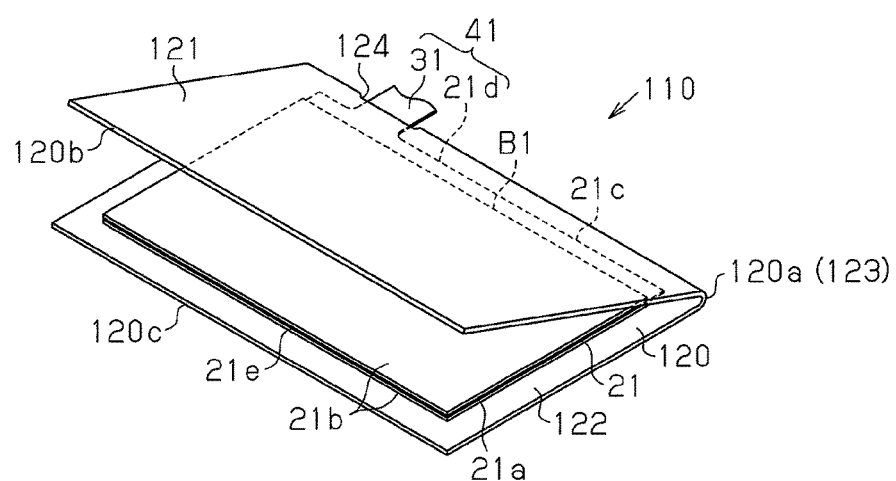

As shown in FIG. 8B, the positive electrode 21 is arranged on the second separator portion 122 when the positive electrode tab 31 is inserted through the through hole 124, and the first separator portion 121 is folded from the folded side 120a, which serves as a base point, to form the positive electrode accommodator 110. In this case, as shown in FIG. 7, the folded portion 123 is located in the proximity of the positive active material-free portion 41. The surrounding of the positive electrode 21 is welded to form a welding portion 130. In the present embodiment, a first welding portion 131 of the welding portion 130 is located in the proximity of the positive electrode 21 to avoid interference with the folded portion 123. The width W4 of the first welding portion 131 of the present embodiment, which is the length in the opposing direction, is the same as the width W2 of the second welding portion 82. In the present embodiment, the folded portion 123 and the first welding portion 131 correspond to the "strong bonding portion".

The operation of the present embodiment will now be described.

The folded portion 123 is located in the proximity of the positive active material-free portion 41. Thus, the bonding strength of the positive active material-free portion 41 (bonding strength of the folded portion 123 and the first welding portion 131) is greater than the bonding strength at the opposite side (bonding strength of the second welding portion 82). It can therefore be expected that the thermal contraction of the separator 120 causes delamination from the bonding of the second welding portion 82, which is located at the opposite side of the proximity of the positive active material-free portion 41. Accordingly, advantage (1) of the first embodiment may be obtained.

Particularly, as shown in FIG. 8A, when thermal contraction occurs, the movement amount near two opposing sides 120b and 120c relative to the folded side 120a is greater than that near the folded side 120a. Therefore, thermal contraction of the separator 120 tends to apply force to the second welding portion 82, which is located in the proximity of the opposing sides 120b and 120c, rather than to the first welding portion 131, which is located in the proximity of the folded portion 123. This easily delaminates the bonding of the second welding portion 82. Further, even when delamination occurs in the bonding of the first welding portion 131, the folded portion 123 would contact the first end portion 21c of the positive electrode 21. This maintains the bonded condition.

In the present embodiment, when the bonding strength of the folded portion 123 is greater (stronger) than that of the second welding portion 82, the first welding portion 131 may be omitted. This allows each of the separators 121 and 122 to be reduced in length by the width W4 of the first welding portion 131 and allows the positive electrode accommodator 70 to be reduced in size.

The above embodiments may be modified as follows.

The third welding portion 83 and the fourth welding portion 84 may be omitted from each of the embodiments. Even in this case, the first welding portions 81, 101, and 131 and the second welding portion 82 would limit displacement of the positive electrode 21.

The active material-free edges 21d and 22d may be omitted from each of the embodiments. Additionally, the active material may be applied to basal portions of the tabs 31 and 32. Even in this case, by setting strong and weak bonding strengths, an exposed metal portion of the negative electrode tab 32 may be avoided from contacting the positive active material layer 21b. That is, the "active material-free portion" includes a structure in which the active material layer is formed on at least a portion of the tab of the electrode that is covered by the separators 23 and 24 and 120.

In the embodiments, the MD direction of the separators 23, 24, and 120 coincides with the opposing direction of the first welding portions 81, 101, and 131 and the second welding portion 82. However, there is no limit to such a configuration. For example, the TD direction of the separators 23, 24, and 120 may coincide with the opposing direction.

In the first embodiment, the second welding portion 82 has the welding area and the width in the opposing direction that are set to be smaller than those of the first welding portion 81 (L2×W2<L1×W1 and W2<W1). However, there is no limit to such a configuration. For example, the configuration may be such that W2=W1 and L2<L1 are satisfied. Alternatively, the configuration may be such that L2=L1 and W2<W1 are satisfied. It is only necessary that at least one of the welding area and the length in the opposing direction of the second welding portion is set to be less than that of the first welding portion. The specific form of the welding portions is not limited as long as this condition is satisfied. For example, the first welding portion may be formed on portions of the first extensions 71a and 72a, and the second welding portion may be formed on portions of the second extensions 71b and 72b. Also, the first welding portion or the second welding portion may have a continuous form.

In the second and third embodiments, the sewn portion 102 and the folded portion 123 are employed as bonding modes other than welding. However, there is no limit to such a configuration. The configuration may have any bonding mode. For example, the separators 23 and 24 may be bonded to each other by an adhesive agent or an adhesive tape.

In the embodiments, the positive electrode 21 is covered (enclosed) by the separators 23, 24, and 120. However, there is no limit to such a configuration. The negative electrode 22 may be covered by the separators 23, 24, and 120.

In the embodiments, the positive electrode 21, the negative electrode 22, and the separators 23 and 24 are rectangular. Instead, the positive electrode 21, the negative electrode 22, and the separators 23 and 24 may be square. Also, the positive electrode 21, the negative electrode 22, and the separators 23 and 24 are not limited to rectangular shapes, and, for example, may be polygonal other than tetragonal or elliptic.

In the embodiments, the negative electrode 22 is smaller than each of the separators 23 and 24. Instead, the negative electrode 22 may have the same shape as the separators 23 and 24.

In the embodiments, the rechargeable battery 10 is a lithium-ion rechargeable battery. However, there is no limit to such a configuration. The rechargeable battery 10 may be nickel-metal hydride or the like. The battery is only needed to include ions, which move between the positive and negative active material layers and give or receive electric charges.

In the embodiments, the rechargeable battery 10 is installed in a vehicle. However, there is no limit to such a configuration. The rechargeable battery 10 may be installed in a different device.

The present invention may be applied to a different electricity storage device such as an electric double-layer capacitor.

The invention claimed is:

1. An electricity storage device comprising:
a first electrode including a first metal foil and a first active material layer formed by applying a first active material to the first metal foil, wherein the first electrode includes a first end portion and a second end portion located at an opposite side of the first end portion, the first end portion is free from the first active material and defines a first active material-free portion that exposes the first metal foil, and the first active material layer extends from a border of the first active material layer and the first active material-free portion to the second end portion;
a first separator portion that covers a first surface of the first electrode;
a second separator portion that covers a second surface of the first electrode located at an opposite side of the first surface in a thicknesswise direction;
a second electrode including a second metal foil and a second active material layer formed by applying a second active material to the second metal foil, wherein the second electrode includes a third end portion corresponding to the first end portion and a fourth end portion corresponding to the second end portion, which is located at an opposite side of the third end portion, the third end portion is free from the second active material and defines a second active material-free portion that exposes the second metal foil, and the second active material layer extends from a border of the second active material layer and the second active material-free portion to the fourth end portion, wherein
the first electrode, the second electrode, the first separator portion, and the second separator portion are overlapped in a layered manner to form an electrode assembly,
the first separator portion and the second separator portion include a strong bonding portion and a weak bonding portion that bond the first separator portion and the second separator portion to each other, the strong bonding portion and the weak bonding portion unifies the first separator portion and the second separator portion, and the strong bonding portion has a bonding strength that is strong relative to a bonding strength of the weak bonding portion so that a thermal contraction of the first separator portion and the second separator portion causes delamination from the weak bonding portion, wherein the first active material-free portion further includes a first electrode tab projecting from the first end portion, the strong bonding portion corresponds to a portion in which the first separator portion and the second separator portion are continuously welded to each other, and is located in the first separator portion and the second separator portion at a section proximate to the first end portion and extends in a longitudinal direction (TD direction) along the first end portion excluding a position overlapped with the first electrode tab, and the weak bonding portion is located in the first separator portion and the second separator portion at a section proximate to the second end portion and extends in the longitudinal direction (TD direction) along the second end portion, wherein a total length L2 of the weak bonding portion extends in the longitudinal direction (TD direction), and a total length L1 of the strong bonding portion extends in the longitudinal direction (TD direction), wherein L1=L2−L3, wherein L3 is a length of the position overlapped with the first electrode tab where the strong bonding portion is not formed, wherein a width W2 of the weak bonding portion extends in a horizontal direction (MD direction) and is less than a width W1 of the strong bonding portion that extends in the horizontal direction (MD direction), wherein the total length L1 of the strong bonding portion is formed with the width W1, and wherein a total bonding area of the weak bonding portion is defined as L2×W2 and is smaller than a total bonding area of the strong bonding portion which is defined as L1×W1.

2. The electricity storage device according to claim 1, wherein
the strong bonding portion is strip-shaped,
the weak bonding portion is strip-shaped.

3. The electricity storage device according to claim 1, wherein the first separator portion and the second separator portion are manufactured by cutting a sheet of a separator material, wherein the sheet of a separator material is formed from a polyolefin fine porous material including openings so that a predetermined degree of porosity is obtained, and the first separator portion and the second separator portion cover the first electrode so that a machine direction when manufacturing the first separator portion and the second separator portion extends in the first direction, which extends from the second end portion toward the first end portion.

4. The electricity storage device according to claim 1, wherein
the second active material-free portion further includes a second tab projecting from the third end portion,
the first tab and the second tab each project in the first direction, which extends from the second end portion toward the first end portion, and
the strong bonding portion and the weak bonding portion extend opposing each other in the first direction.

5. The electricity storage device according to claim 1, wherein the electricity storage device is a rechargeable battery.

6. The electricity storage device according to claim 1, wherein
the weak bonding portion includes a first bonding portion, and
the strong bonding portion includes the first bonding portion and a second bonding portion, of which type of bonding differs from the first bonding portion.

7. An electricity storage device comprising:
a first electrode including a first metal foil and a first active material layer, wherein the first metal foil includes first sheet surfaces located at opposite sides of the first metal foil in a thicknesswise direction, a first active material layer is formed by applying a first active material to the first sheet surfaces, wherein each of the first sheet surfaces includes a first end portion and a second end portion located at an opposite side of the first end portion, the first end portion is free from the first active material and defines a first active material-free portion including a first active material-free edge, the first active material-free edge exposes the first metal foil and extends along the first end portion, and the first active material layer extends from a border of the first active material layer and the first active material-free edge to the second end portion;
a first separator portion that covers one first sheet surface of the first electrode;
a second separator portion that covers the other first sheet surface of the first electrode;
a second electrode including a second metal foil and a second active material layer, wherein the second metal foil includes second sheet surfaces located at opposite sides of the second metal foil in a thicknesswise direction, a second active material layer is formed by applying a second active material to the second sheet surfaces, wherein each of the second sheet surfaces includes a third end portion corresponding to the first end portion and a fourth end portion corresponding to the second end portion, which is located at an opposite side of the third end portion, the third end portion is free from the second active material and defines a second active material-free portion including a second active material-free edge, includes a second active material-free edge, the second active material-free edge exposes the second metal foil and extends along the third end portion, and the second active material layer extends from a border of the second active material layer and the second active material-free edge to the fourth end portion, wherein
the first electrode, the second electrode, the first separator portion, and the second separator portion are overlapped in a layered manner to form an electrode assembly,
the first separator portion and the second separator portion include a strong bonding portion and a weak bonding portion that bond the first separator portion and the second separator portion to each other, the strong bonding portion and the weak bonding portion unifies the first separator portion and the second separator portion, and the strong bonding portion has a bonding strength that is strong relative to a bonding strength of the weak bonding portion so that a thermal contraction of the first separator portion and the second separator portion causes delamination from the weak bonding portion, wherein the first active material-free portion further includes a first electrode tab projecting from the first end portion, the strong bonding portion corresponds to a portion in which the first separator portion and the second separator portion are continuously welded to each other, and is located in the first separator portion and the second separator portion at a section proximate to the first end portion and extends in a longitudinal direction (TD direction) along the first end portion excluding a position overlapped with the first electrode tab, and the weak bonding portion is located in the first separator portion and the second separator portion at a section proximate to the second end portion and extends in the longitudinal direction (TD direction) along the second end portion, wherein a total length L2 of the weak bonding portion extends in the longitudinal direction (TD direction), and a total length L1 of the strong bonding portion extends in the longitudinal direction (TD direction), wherein L1=L2−L3, wherein L3 is a length of the position overlapped with the first electrode tab where the strong bonding portion is not formed, wherein a width W2 of the weak bonding portion extends in a horizontal direction (MD direction) and is less than a width W1 of the strong bonding portion that extends in the horizontal direction (MD direction), wherein the total length L1 of the strong bonding portion is formed with the width W1, and wherein a total bonding area of the weak bonding portion is defined as L2×W2 and is smaller than a total bonding area of the strong bonding portion which is defined as L1×W1.

8. The electricity storage device according to claim 7, wherein the strong bonding portion is strip-shaped, the weak bonding portion is strip-shaped.

9. The electricity storage device according to claim 7, wherein the first separator portion and the second separator portion are manufactured by cutting a sheet of a separator material, wherein the sheet of a separator material is formed from a polyolefin fine porous material including openings so that a predetermined degree of porosity is obtained, and the first separator portion and the second separator portion cover the first electrode so that a machine direction when manufacturing the first separator portion and the second separator portion extends in the first direction, which extends from the second end portion toward the first end portion.

10. The electricity storage device according to claim 7, wherein the second active material-free portion further includes a second tab projecting from the third end portion, the first tab and the second tab each project in the first direction, which extends from the second end portion toward the first end portion, and the strong bonding portion and the weak bonding portion extend opposing each other in the first direction.

11. The electricity storage device according to claim 7, wherein the electricity storage device is a rechargeable battery.

12. The electricity storage device according to claim 7, wherein the weak bonding portion includes a first bonding portion, and the strong bonding portion includes the first bonding portion and a second bonding portion, of which type of bonding differs from the first bonding portion.

13. An electricity storage device comprising:

a first electrode including a first metal foil and a first active material layer formed by applying a first active material to the first metal foil, wherein the first electrode includes a first end portion and a second end portion located at an opposite side of the first end portion, the first end portion is free from the first active material and defines a first active material-free portion that exposes the first metal foil, and the first active material layer extends from a border of the first active material layer and the first active material-free portion to the second end portion;

a first separator portion that covers a first surface of the first electrode;

a second separator portion that covers a second surface of the first electrode located at an opposite side of the first surface in a thicknesswise direction;

a second electrode including a second metal foil and a second active material layer formed by applying a second active material to the second metal foil, wherein the second electrode includes a third end portion corresponding to the first end portion and a fourth end portion corresponding to the second end portion, which is located at an opposite side of the third end portion, the third end portion is free from the second active material and defines a second active material-free portion that exposes the second metal foil, and the second active material layer extends from a border of the second active material layer and the second active material-free portion to the fourth end portion, wherein the first electrode, the second electrode, the first separator portion, and the second separator portion are overlapped in a layered manner to form an electrode assembly, the first separator portion and the second separator portion include a strong bonding portion and a weak bonding portion that bond the first separator portion and the second separator portion to each other, the strong bonding portion and the weak bonding portion unifies the first separator portion and the second separator portion, and the strong bonding portion has a bonding strength that is strong relative to a bonding strength of the weak bonding portion so that a thermal contraction of the first separator portion and the second separator portion causes delamination from the weak bonding portion, wherein the first active material-free portion further includes a first electrode tab projecting from the first end portion, the strong bonding portion corresponds to a portion in which the first separator portion and the second separator portion are continuously welded to each other, and is located in the first separator portion and the second separator portion at a section proximate to the first end portion and extends in a longitudinal direction (TD direction) along the first end portion excluding a position overlapped with the first electrode tab, and the weak bonding portion is located in the first separator portion and the second separator portion at a section proximate to the second end portion and extends in the longitudinal direction (TD direction) along the second end portion, wherein a width W2 of the weak bonding portion extends in a horizontal direction (MD direction) and is less than a width W of the strong bonding portion that extends in the horizontal direction (MD direction), wherein the total length L1 of the strong bonding portion is formed with the width W1, wherein a total length L2 of the weak bonding portion extends in the longitudinal direction (TD direction), and a total length L1 of the strong bonding portion extends in the longitudinal direction (TD direction), wherein L1=L2−L3, wherein L3 is a length of the position overlapped with the first electrode tab where the strong bonding portion is not formed, wherein when viewed from a stacking direction of the electrode assembly, the first electrode tab is positioned to be sandwiched between two parts of the strong bonding portion that are spaced apart from each other along the longitudinal direction, wherein each of the two parts of the strong bonding portion have the same width W1.

14. An electricity storage device comprising:

a first electrode including a first metal foil and a first active material layer, wherein the first metal foil includes first sheet surfaces located at opposite sides of the first metal foil in a thicknesswise direction, a first active material layer is formed by applying a first active material to the first sheet surfaces, wherein each of the first sheet surfaces includes a first end portion and a second end portion located at an opposite side of the first end portion, the first end portion is free from the first active material and defines a first active material-free portion including a first active material-free edge, the first active material-free edge exposes the first metal foil and extends along the first end portion, and the first active material layer extends from a border of the first active material layer and the first active material-free edge to the second end portion;

a first separator portion that covers one first sheet surface of the first electrode;

a second separator portion that covers the other first sheet surface of the first electrode;

a second electrode including a second metal foil and a second active material layer, wherein the second metal foil includes second sheet surfaces located at opposite sides of the second metal foil in a thicknesswise direction, a second active material layer is formed by applying a second active material to the second sheet surfaces, wherein each of the second sheet surfaces includes a third end portion corresponding to the first end portion and a fourth end portion corresponding to the second end portion, which is located at an opposite side of the third end portion, the third end portion is free from the second active material and defines a second active material-free portion including a second active material-free edge, includes a second active material-free edge, the second active material-free edge exposes the second metal foil and extends along the third end portion, and the second active material layer extends from a border of the second active material layer and the second active material-free edge to the fourth end portion, wherein the first electrode, the second electrode, the first separator portion, and the second separator portion are overlapped in a layered manner to form an electrode assembly, the first separator portion and the second separator portion include a strong bonding portion and a weak bonding portion that bond the first separator portion and the second separator portion to each other, the strong bonding portion and the weak bonding portion unifies the first separator portion and the second separator portion, and the strong bonding portion has a bonding strength that is strong relative to a bonding strength of the weak bonding portion so that a thermal contraction of the first separator portion and the second separator portion causes delamination from the weak bonding portion, wherein the first active material-free portion further includes a first electrode tab projecting from the first end portion, the strong bonding portion corresponds to a portion in which the first separator portion and the second separator portion are continuously welded to each other, and is located in the first separator portion and the second separator portion at a section proximate to the first end portion and extends in a longitudinal direction (TD direction) along the first end portion excluding a position overlapped with the first electrode tab, and the weak bonding portion is located in the first separator portion and the second separator portion at a section proximate to the second end portion and extends in the longitudinal direction (TD direction) along the second end portion, wherein a total length L2 of the weak bonding portion extends in the longitudinal direction (TD direction), and a total length L1 of the strong bonding portion extends in the longitudinal direction (TD direction), wherein L1=L2−L3, wherein L3 is a length of the position overlapped with the first electrode tab where the strong bonding portion is not formed, and wherein a width W2 of the weak bonding portion extends in a horizontal direction (MD direction) and is less than a width W1 of the strong bonding portion that extends in the horizontal direction (MD direction), wherein the total length L1 of the strong bonding portion is formed with the width W1, wherein when viewed from a stacking direction of the electrode assembly, the first electrode tab is positioned to be sandwiched between two parts of the strong bonding portion that are spaced apart from each other along the longitudinal direction, wherein each of the two parts of the strong bonding portion have the same width W1.

* * * * *